Aug. 15, 1944.        R. SWOBODA, SR        2,356,099
SAUSAGE LINKING MACHINE
Original Filed Sept. 7, 1937        2 Sheets-Sheet 1

INVENTOR
RICHARD SWOBODA SR.
BY
ATTORNEYS

Aug. 15, 1944. R. SWOBODA, SR 2,356,099
SAUSAGE LINKING MACHINE
Original Filed Sept. 7, 1937  2 Sheets-Sheet 2

INVENTOR
RICHARD SWOBODA SR.
BY
ATTORNEY

Patented Aug. 15, 1944

2,356,099

UNITED STATES PATENT OFFICE 2,356,099

SAUSAGE LINKING MACHINE

Richard Swoboda, Sr., Detroit, Mich.

Substituted for abandoned application Serial No. 162,806, September 7, 1937. This application January 14, 1942, Serial No. 426,746

42 Claims. (Cl. 17—34)

This application is a substitute for my forfeited application filed September 7, 1937, Serial No. 162,806, which was formally allowed December 12, 1939, and embodies an invention which relates to a sausage linking machine adapted automatically to measure predetermined lengths of sausage, to compress the casing at spaced points, and to rotate the intermediate portion between adjacent pinched points in opposite directions.

It is an object of the invention to provide a sausage linking machine which is entirely automatic in operation.

It is a further object of the invention to provide a sausage linking machine which has automatic mechanism for measuring predetermined lengths of sausage.

It is a further object of the invention to provide a sausage linking machine which is adapted to compress the sausage casing at predetermined spaced points.

It is a further object of the invention to provide a sausage linking machine which has link twisting mechanism adapted to rotate adjacent links in opposite directions.

It is a further object of the invention to provide a link turning element of novel design.

It is a further object of the invention to provide novel mechanism for compressing the sausage casing prior to twisting.

It is a further object of the invention to provide pinching means and link rotating means in a novel relationship.

Other objects of the invention will be apparent from the following detailed description and when taken in conjunction with the drawings in which Figure 1 is a vertical section taken perpendicular to the axis of the machine;

Figure 1:
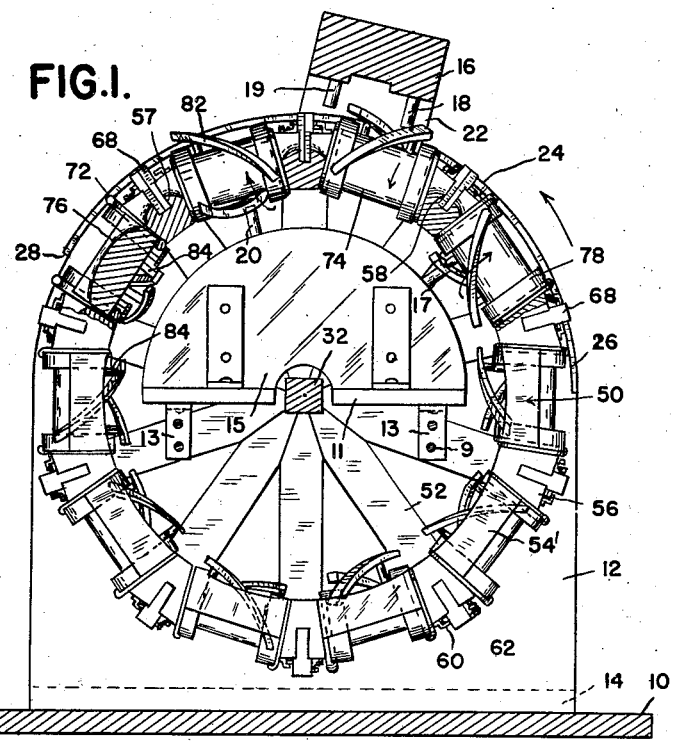

In the manufacture of link sausage a method of linking has been practiced in which the stuffed casing is pinched or compressed to a small area at spaced points and the link thus formed by the two adjacent pinched points is rotated so as to twist the casing intermediate the links. In the practice of this method of linking sausages it has been the practice to twist adjacent links in opposite directions, which results in increased twisting between the links, as will be obvious. The present machine is adapted to perform the above described operation of linking sausage in an entirely automatic manner.

Generally speaking, the machine comprises a rotary member upon which are mounted a plurality of rotatable link twisting elements. Intermediate these elements are provided means for pinching or compressing the sausage casing to a small compass. Automatic mechanism is associated with the rotary mechanism which will cause the pinching means to operate and then subsequently in timed relation will cause the sausage twisting elements to twist adjacent links in opposite directions.

Although the inventive concept could be expressed in various physical manifestations, I have illustrated herein a preferred form of my improved sausage linking machine.

Side plates 12 are rigidly secured to a base 10 by securing means 14. These side plates are in spaced relation and are interconnected and inter-supported at the top by a block 16 which has depending side portions 22 at each end thereof. The block 16 is adapted to span the spaced plates 12 and the side portions 22 are each secured to a corresponding side plate.

Figure 3:
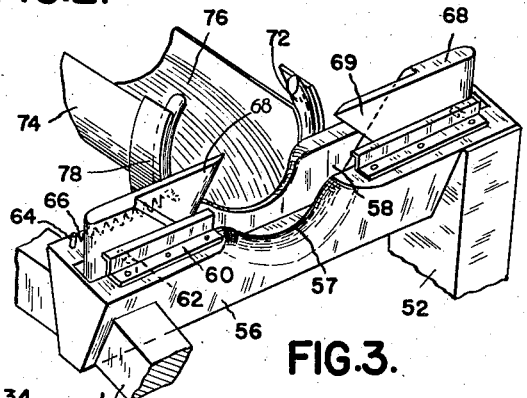
Figure 3 is an enlarged detail perspective.

The sausage linking mechanism is mounted on a drum member generally indicated at 50 which has a shaft 32 journaled for rotation in the side plates 12. The drum member 50 comprises spaced radial spokes 52 not directly connected at their outer ends. These spokes are located at one side of the drum member, the other side being entirely clear for a purpose which will later appear. At the outer end of spokes 52 are secured guide members 56. These guide members extend parallel to the axis of the drum and their free ends are interconnected by bracing pieces 54'. Each guide member 56 has an outwardly opening slot 58 extending lengthwise thereof. Centrally of each slot the walls forming the slot are cut away and rounded as indicated at 57 in Fig. 3. These guide members form supports and guides for the pinch plates 68 which are slidably mounted in the slots. Additional guide plates 60 are secured adjacent one edge of the slots and take the form of substantially Z-shaped brackets having a flange projecting toward the pinch plate 68 in spaced relation to the top surface of the guide blocks 56.

Figure 2:
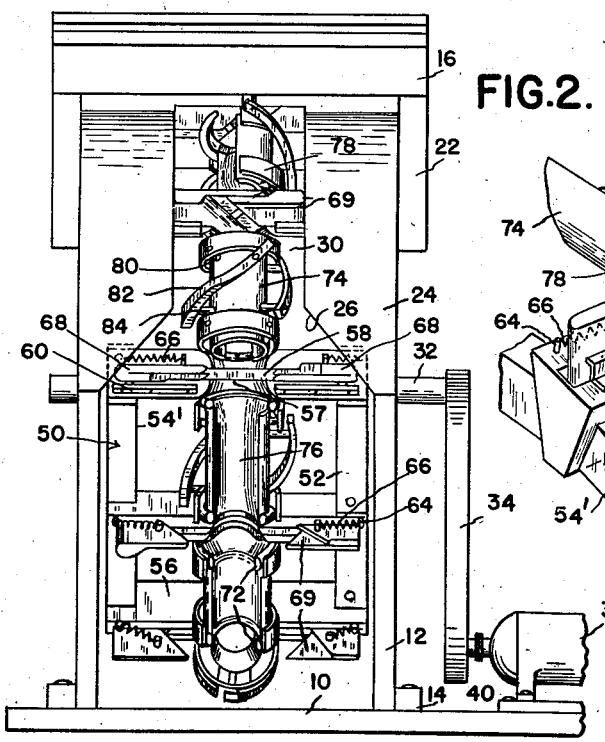
Figure 2 is a side elevation.

The pinch plates 68 which are mounted in the slots 58 comprise pairs of flat plates with a V-shaped opening at one end thereof. As mounted in the machine these V-shaped openings confront each other and are adapted to define a quadrilateral opening of variable size as the plates are moved toward each other. In order to facilitate the cooperating engagement between the pinch plates 68, each is formed with a pair of projecting triangular portions 69. On each pinch plate the projecting portions 69 lie on opposite sides of a longitudinal plane, and are so arranged on the pairs of plates that they are adapted when moved toward each other to slidably engage and interlock, as best seen in Fig. 2. Each plate 68 has a projecting pin 62 formed therein which is received between the top of the guide block 56 and the projecting flange of the guide plate 60. This pin serves to lock the pinch plate in position in the slot but also permits withdrawal of the pinch plate by sliding the plate centrally until the pin disengages from the guide groove formed. A pin 64 is secured to the top of the guide block and has attached thereto one end of a resilient member such as a small coil spring 66. The other end of the spring 66 is secured to the pinch plate. The relationship is such that the spring 66 constantly urges the pairs of guide plates apart to the position shown in Fig. 3.

Figure 4:
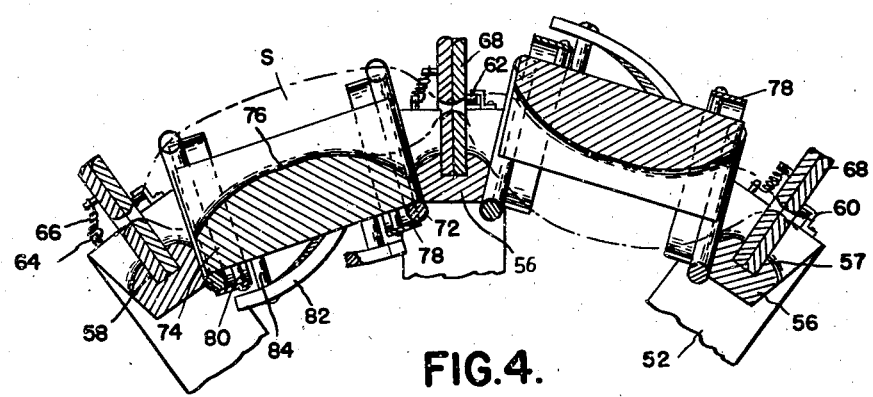
Figure 4 is a sectional detail of the link pinching and twisting mechanism.
Figure 5:
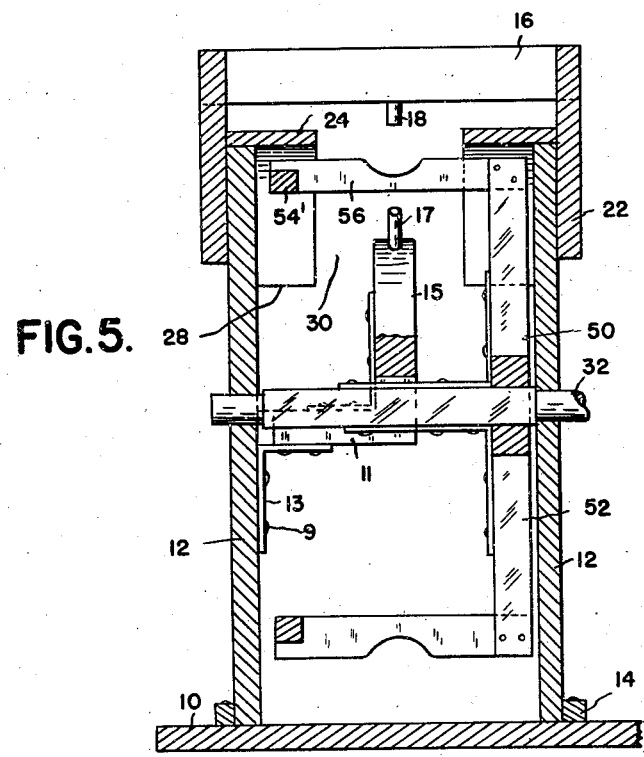
Figure 5 is a vertical section with the link twisting elements and pinch plates omitted.

Means for rotating the individual links of sausage is provided between each adjacent pair of pinch plates. This takes the form of a twisting element 74 which is hollowed throughout its length to form a recess 76. As best seen in Fig. 4, this recess 76 is concave in transverse cross section but has a convex bottom as viewed in longitudinal cross section.

Interrupted ring members 72 are secured to each side of each guide block 56. These ring members are open at the top in order to permit the sausage casing to be introduced through the opening. The twisting elements 74 are formed from substantially cylindrical pieces and are of a size adapted to fit snugly within the interrupted ring members 72. Since the ring members 72 cover substantially more than half of a circle, these members are themselves sufficient to accurately guide and support the rotatable twisting elements 74. If desired, however, additional securing means may be provided which take the form of interrupted annular members or plates 78 secured to the twisting elements 74 by securing means 80. These plates will be interrupted for an arc of a circle corresponding to the opening in the ring 72. By means of this construction an exceedingly accurate and free guiding action is obtained for the rotatable twisting element 74.

The rotatable link twisting elements 74 are additionally provided with helical cam members 82 which are rigidly connected to the twisting elements 74 by means of supports 84 which if desired may take the form of a collar and screw. As shown in the drawings, I provide two such cam elements 82 for each link twisting element. However, it is possible to obtain the same action with a single cam member or, if desired, more than two may be used. As will be seen in Figs. 1 and 2, adjacent link twisting elements have cam elements of opposite lead which will result in adjacent elements twisting in opposite directions.

An important feature of my invention resides in the particular relationship between link twisting elements and the pinch plates. The center of the apertures provided by the pinch plates 68 all lie on a circle concentric with a drum member. The twisting elements 74 are positioned relative to the pinch plates so that the central portion of the concave recess 76 lies at least as far radially removed from the center of the drum as the straight line forming the apertures of adjacent pinch plates, and preferably far enough to be tangent to the circle defined by these apertures. This results in operation in the sausage link taking the position indicated in dotted lines at S in Fig. 4. I have found that by my improved link twisting element, and that particularly due to its novel relationship with the apertures and pinch plates, it is possible to rotate the individual links rapidly and easily without tearing the casing. I consider this feature of my invention as of particular importance, either alone or in the particular machine disclosed.

Stationary pins 17, 18, 19 and 20 are provided in the path of the cam members 82. Pins 18 and 19 are secured on the inner surface of block 16, while pins 17 and 20 are secured on a semi-circular block 15 which is secured to one side wall 12 by means of a shelf 11, which in turn is secured to the side wall by brackets 13 by suitable securing means such as screws 9. As will be readily apparent, the means for connecting the drum member to its axial shaft 32 by means of spokes 52 located at one side of the drum member is to provide the necessary space for the mounting of the semi-circular block 15.

Secured to the top of each side member 12 and extending therearound for a distance somewhat less than 180° are two plates 24. These plates extend inwardly from the side walls 12 a short distance and provide a space 30 therebetween. Through this segmental annular space 30 project the cam members 82 which are thus permitted to strike the inwardly projecting pins 18 and 19. The ends of the plates 24 at the entering end of the segmental annular passage 30 are cut off at an angle to provide camming surfaces 26. The opposite end of the plates is cut off squarely as indicated at 28 in Fig. 1.

Suitable driving mechanism for rotating the drum member is provided and as illustrated takes the form of a motor 38 which is secured to the base 10 by suitable securing means 40. The motor 38 is connected to the shaft 32 by means of a belt 34. It is obvious, of course, that any other suitable driving means may be employed, and if desired, a crank may be directly connected to the shaft 32.

The operation of my improved sausage linking machine will now be readily apparent. A stuffed casing is introduced into the machine by placing one end thereof in a twisting element 74. As the drum rotates, the casing is drawn around the periphery of the drum. Upon rotation of the drum the pinch plates 68 eventually strike the camming surfaces 26 and are thereby forced toward each other to a position in which only a small quadrilateral aperture is left therebetween. This, of course, compresses the casing of the sausage and places it in a condition to permit ready twisting thereof. Further rotation of the drum will eventually cause the next following pair of pinch plates to operate, at which time a predetermined length of sausage has been measured off and compressed at the ends thereof. Shortly after the second pair of pinch plates has operated, one of the cam members 82 strikes the first camming pin 17. As will be obvious from an inspection of Fig. 1, this will cause rotation of the twisting element either to the right or to the left, depending upon whether the cam member is of right or left hand lead. Just before the cam member 82, which is engaged by the stop pin 17, passes out of operative engagement therewith, another cam member strikes the second stop pin 18, continuing rotation in the same direction.

In the same manner stop pins 19 and 20 come into engagement with the camming members and continue rotation of the twisting element. Shortly after the last stop pin 20 has passed out of operative engagement with the camming member 82, the section under consideration passes the squared ends 28 of the members 24. This permits the springs 66 to retract the pinch plates 68 and the finished linked sausage is then drawn away from the machine.

It will be obvious that instead of four pins, as illustrated, suitable mechanism can be provided to rotate the link twisting elements. Thus, for example, by increasing the helical angle of the camming members, an increased amount of twisting could be provided as actuated by each pin.

While I have illustrated and described various preferred embodiments of my invention, it will be apparent to those skilled in the art that various additions, omissions, substitutions and modifications may be made within the scope of my invention, as indicated by the appended claims.

What I claim as my invention is:

1. In a sausage linking machine, pinching means comprising a pair of plates slidable toward and away from each other, each plate having forwardly extending arms defining a V-shaped opening, the arms of each plate lying on opposite sides of a central plane and overlapping the corresponding arms of the other plate to form a generally quadrilateral opening of variable size, resilient means biasing said plates apart, and cam means for moving them together against said resilient means.

2. In a sausage linking machine, pinching means comprising a pair of plates slidable toward and away from each other, each plate having forwardly extending arms defining a V-shaped opening, the arms of each plate lying on opposite sides of a central plane and overlapping the corresponding arms of the other plate to form a generally quadrilateral opening of variable size, resilient means biasing said plates apart, and cam means for moving them together against said resilient means, said plates in inoperative position being separated so that the sausage casing may be introduced laterally.

3. In a sausage linking machine, a link twister comprising an open top substantially trough-shaped body mounted for rotation about a longitudinal axis thereof, the bottom of said trough being curved longitudinally.

4. In a device of the character described, a twisting element of generally cylindrical form, said element being hollowed out on one side to form an open top trough-shaped recess extending the length of said element, said recess being of greater depth adjacent the ends of said element whereby said recess has a convex bottom as viewed in longitudinal section.

5. In a device of the character described, a twisting element of generally cylindrical form, said element being hollowed out on one side to form an open top trough-shaped recess extending the length of said element, said recess being transversely concave and longitudinally convex.

6. In a sausage linking machine, twisting elements comprising longitudinally hollowed out cylindrical bodies, and means for mounting said elements for rotation about a longitudinal axis comprising incomplete ring members substantially greater than 180° and embracing the ends of said cylindrical bodies.

7. In a sausage linking machine, twisting elements comprising longitudinally hollowed out cylindrical bodies, means for mounting said elements for rotation about a longitudinal axis comprising incomplete ring members substantially greater than 180° and embracing the ends of said cylindrical bodies, and incomplete annular guard members secured to said elements and overlying said ring members.

8. In a machine of the class described, a rotary drum having radially extending spokes, guide members at the outer ends of said spokes, said guide members extending substantially parallel to the axis of said drum and having outwardly opening longitudinally extending slots therein, and sausage pinching means carried by the slots in said guide members.

9. In a machine of the class described, a rotary drum having radially extending spokes, members projecting at substantially right angles from said spokes and disposed substantially parallel to the axis of said drum, and cooperating sausage pinching plates carried by and slidable lengthwise of said members.

10. In a machine of the class described, a rotary drum having radially extending spokes, guide members at the outer ends of said spokes, said guide members extending substantially parallel to the axis of said drum and having outwardly opening longitudinally extending slots therein, and means slidable in said slots for pinching sausage to a relatively small cross section.

11. In a machine of the class described, a rotary drum having radially extending spokes, members projecting laterally from said spokes and disposed substantially parallel to the axis of said drum, and sausage pinching means carried by and movable lengthwise of said laterally projecting members.

12. In a machine of the class described, a rotary drum having radially extending spokes, members projecting laterally from said spokes and disposed substantially parallel to the axis of said drum, and cooperating sausage pinching plates carried by and slidable lengthwise of said members.

13. In a machine of the class described, a rotary drum having radially extending spokes, arms projecting from said spokes and disposed substantially parallel to the axis of said drum, said arms having longitudinally extending outwardly opening slots therein, the walls of each slot having aligned transversely extending recesses substantially midway their ends for receiving a sausage casing, and sausage pinching means including cooperating plates slidable in said slots relative to said transverse recesses.

14. In a machine of the class described, a rotary drum having radially extending spokes, arms projecting from said spokes and disposed substantially parallel to the axis of said drum, interrupted ring members secured to each side of said arms, said ring members being open at the top for the reception of a sausage casing, sausage twisting members extending between and carried by said ring members, cam elements rigid with said twisting members, and means engageable with said cam elements during rotation of the drum to cause said twisting elements to be actuated.

15. In a machine of the class described, a rotary drum having radially extending spokes, arms projecting from said spokes and disposed substantially parallel to the axis of said drum, interrupted ring members secured to each side of said arms, said ring members being open at the top for the reception of a sausage casing, sausage twisting members extending between and carried by said ring members, cam elements rigid with said twisting members, and means operable during rotation of the drum to cause said twisting elements to be actuated, including stationary means in the path of said cam elements.

16. In a machine of the class described, a rotary drum having radially extending means and bars carried by said means and disposed substantially parallel to the axis of said drum, said bars having longitudinally extending slots therein, cooperating sausage pinching plates slidable in said slots toward and from each other and having opposed substantially V-shaped sausage receiving openings, yieldable means urging said pinch plates apart, and means for positively moving said pinch plates toward each other.

17. In a machine of the class described, a rotary drum having radially extending means and bars carried by said means and disposed substantially parallel to the axis of said drum, said bars having longitudinally extending slots therein, cooperating sausage pinching plates slidable in said slots toward and from each other and having opposed substantially V-shaped sausage receiving openings, means operable during rotation of the drum to move said plates toward each other to operative pinching position, and means carried by the drum and operable when the last mentioned means is idle to move said plates apart to an inoperative position.

18. In a machine of the class described, a stationary support, a drum having a shaft journaled in said support, spokes extending radially outward from said shaft, opposed pinch plates for sausage at the outer ends of said spokes and slidable longitudinally to and from each other, and guides for said longitudinally slidable pinch plates carried by said spokes.

19. In a machine of the class described, a stationary support, a drum having a shaft journaled in said support, spokes extending radially outward from said shaft, opposed pinch plates for sausage at the outer ends of said spokes and slidable longitudinally to and from each other, means constantly urging the pinch plates apart, and cam means carried by said support and engageable by said pinch plates during rotation of the drum to cause the pinch plates to be moved toward each other.

20. In a machine of the class described, a rotatable circular drum, a support therefor, means at the periphery of the drum for pinching sausage, means carried by said support outside said drum for actuating said pinching means, means also at the periphery of said drum arranged alternately with respect to said pinching means for twisting sausage, and means carried by said support inside and outside said drum for actuating said twisting means.

21. In a machine of the class described, a rotatable circular drum, a support therefor, means at the periphery of the drum for twisting sausage, cams carried by said twisting means, and means carried by said support inside and outside said drum engageable with said cams for actuating said twisting means.

22. In a machine of the class described, a support, a rotary drum having a shaft journaled in said support, spokes extending radially outward from said shaft at one side of said drum, guide bars extending inwardly from said spokes in substantially parallel relation to said shaft, and opposed sausage pinching plates slidable longitudinally of said guide bars.

23. In a machine of the class described, a rotary drum having a shaft, radially extending members projecting outward from said shaft, elongated guide members extending from said radially extending members in substantially parallel relation to said shaft, said guide members having longitudinally extending outwardly opening slots, and sausage pinching plates slidable longitudinally of said slots in opposed relation to each other.

24. In a sausage linking machine, a rotary drum, circumferentially spaced means on the drum for pinching spaced portions of a sausage to a small cross section, and means between the circumferentially spaced pinching means for twisting the sausage intermediate said pinched portions, said twisting means comprising a rotatable open top trough-shaped member for receiving and twisting sausage, the bottom of the trough being longitudinally convex whereby a substantially straight line between the spaced pinching means is substantially tangent to the convex bottom at approximately the center thereof, and means for rotating said sausage receiving member relative to the pinching means to effect a twisting operation.

25. In a sausage linking machine, a rotary drum, circumferentially spaced means on the drum for pinching spaced portions of a sausage to a small cross section, and means between the spaced pinching means for twisting the sausage intermediate said pinched portions, the pinching means at each of said spaced points of the drum comprising a pair of longitudinally slidable transversely extending opposed plates, each of said plates being slidable toward the other, adjacent portions of said plates having opposed substantially V-shaped notches and being movable in overlapping relation to each other so that said notches define a substantially quadrilateral opening of variable size.

26. In a sausage linking machine, a rotary drum, circumferentially spaced means on the drum for pinching spaced portions of a sausage to a small cross section, the pinching means at each of said spaced points of the drum comprising a pair of longitudinally slidable transversely extending opposed plates, each of said plates being slidable toward the other, adjacent portions of said plates having arms defining a V-shaped opening, the arms of the respective plates lying on opposite sides of a central plane so that an arm of one plate overlaps the corresponding arm of the other plate to form a generally quadrilateral opening of variable size.

27. In a sausage linking machine, a rotary drum, circumferentially spaced means on the drum for pinching spaced portions of a sausage, and rotatable means between the spaced pinching means for twisting the sausage between the pinched portions, said twisting means comprising an elongated body mounted for rotation about a longitudinal axis, said body being hollowed out longitudinally to form an open top trough-shaped recess, the bottom of said recess being longitudinally convex so that a straight line between the spaced pinching means is substantially tangent to the convex bottom at approximately the center thereof.

28. A sausage linking machine comprising a frame, a rotary drum mounted in said frame, means for rotating said drum, link forming mechanism on the periphery of said drum comprising transversely extending opposed pinch plates mounted on said drum at regular intervals and slidable longitudinally toward each other to pinch spaced portions of a sausage casing, cam means carried by said frame and effective on rotation of said drum to cause said plates to slide longitudinally toward each other to impinge on and pinch the sausage casing, means between the pinch plates for twisting the sausage casing between the pinched portions thereof comprising elongated longitudinally concave bodies mounted for rotation about a longitudinal axis, cam means fixed to said concave bodies, and means fixed to the frame in the path of the cam means on said bodies and effective on rotation of said drum to engage the last mentioned cam means and thereby rotate said bodies to effect twisting operations, the last mentioned cam means on adjacent bodies having opposite leads whereby adjacent bodies are rotated in opposite directions.

29. In a sausage linking machine, a drum over which a stuffed sausage casing is led, means at circumferentially spaced points of said drum for pinching spaced portions of the sausage casing, and twisting elements mounted for rotation between said pinching means, each of said elements having an open top trough-shaped recess, the bottom of said recess extending radially to a point coincident with a straight line between the centers of said pinching means.

30. A sausage linking machine having a frame, a rotary drum mounted in said frame, means for rotating said drum, transversely extending opposed longitudinally slidable pinching means on said drum at spaced points circumferentially thereof, cam means on said frame to slide said pinching means toward each other to pinch portions of a sausage, rotary twisting elements on the drum between said pinching means, single elements of the drum serving as guides for the pinching means and as supports for the twisting elements, cam surfaces on said rotary twisting elements, the cam surfaces of adjacent twisting elements being of opposite sense, and means on said frame in the path of the cam surfaces and adapted to impinge said cam surfaces to thereby rotate the twisting elements.

31. A sausage linking machine having a frame, a rotary drum mounted in said frame, means for rotating said drum, transversely extending opposed longitudinally slidable pinching means on said drum at spaced points circumferentially thereof, cam means on said frame to slide said pinching means toward each other to pinch portions of a sausage, rotary twisting elements on the drum between said pinching means, single elements of the drum serving as guides for the pinching means and as supports for the twisting elements, cam surfaces on said twisting elements, the cam surfaces on adjacent twisting elements being of opposite sense, and a series of abutments on said frame in the path of and adapted to be engaged by said cam surfaces during rotation of said drum, the cam surfaces of each twisting element engaging said abutments serially to rotate adjacent twisting elements in opposite directions.

32. In a machine of the class described, a rotatable circular drum, a support therefor, reciprocating sausage pinching means at circumferentially spaced points of said drum and disposed substantially parallel to the axis of said drum, rotary sausage twisting members between the circumferentially spaced points aforesaid, single elements of the drum constituting guides for the reciprocating pinching means and supports for the rotary twisting means, helical cams carried by said twisting members, opposed inclined means fixed to said support and engageable directly with the pinching means during rotation of the drum to actuate said pinching means, and means fixed to said support and engageable with said helical cams during rotation of the drum to rotate said twisting members.

33. In a machine of the class described, a rotary drum having circumferentially spaced transversely extending elongated members substantially parallel to the axis of the drum, reciprocating sausage pinching means movable lengthwise of said members, rotary sausage twisting members between said elongated members, and guide means for said twisting members carried by opposite sides of said transversely extending elongated members.

34. In a machine of the class described, a stationary support, a drum mounted to rotate on said support, opposed transversely extending plates at circumferentially spaced points of said drum slidable longitudinally toward each other to pinch sausage, rotary members for twisting sausage located between the circumferentially spaced points aforesaid and extending circumferentially of the drum, projections on said stationary support, helical cam members carried by the twisting members and engageable with said projections to rotate said twisting members, the cam members for adjacent twisting members having opposite leads, and cam members carried by said support and engageable with said pinch plates to move the same to an operative pinching position.

35. In a machine of the class described, a rotary drum having circumferentially spaced transversely extending substantially channel-shaped members, means slidable lengthwise of the channels in said members for pinching sausage, circumferentially extending rotary means upon opposite sides of said transversely extending channel-shaped members for twisting sausage, and bearings for said rotary means carried by the side walls of the channel-shaped members.

36. In a machine of the class described, a rotary drum, slidable sausage pinching means at circumferentially spaced points of the drum, rotary sausage twisting means at circumferentially spaced points of the drum, bearings for the rotary means, and single elements providing slideways for the pinching means and carriers for the bearings for the rotary means.

37. In a machine of the class described, a rotary drum having circumferentially spaced transversely extending elongated members disposed substantially parallel to the axis of rotation thereof, means slidable lengthwise of said elongated members for pinching sausage, interrupted ring members secured to opposite sides of the transversely extending elongated members, and circumferentially extending rotary means carried by said ring members for twisting sausage.

38. In a machine of the class described, a rotary drum having circumferentially spaced transversely extending elongated members disposed substantially parallel to the axis of rotation thereof, said members having longitudinally extending slots therein, cooperating members slidable lengthwise of the slots in said elongated members for pinching sausage, interrupted ring members secured to opposite sides of the transversely extending elongated members, and elongated circumferentially extending rotary sausage twisting members carried by and movable relative to said ring members.

39. In a machine of the class described, a rotary drum having circumferentially spaced transversely extending elongated members disposed substantially parallel to the axis of rotation thereof, means slidable within and lengthwise of said members for pinching sausage, rotatable circumferentially extending sausage twisting members between the transversely extending elongated members, and means carried by opposite sides of said elongated members for guiding the twisting members during rotary movement thereof.

40. In a machine of the class described, a rotary drum, slidable means at circumferentially spaced points of the drum for pinching sausage, rotatable sausage twisting members at circumferentially spaced points of the drum, slideways for the pinching means, and bearings for both ends of the twisting members carried by said slideways.

41. In a machine of the class described, a rotary drum having circumferentially spaced elongated transversely extending bars disposed substantially parallel to the axis of said drum, sausage pinching means slidable lengthwise of said bars to effect a pinching operation, and means operable during rotation of the drum to slide the pinching means and to hold the same in operative pinching position, including stationary circumferentially extending arcuate members engageable by said pinching means.

42. In a machine of the class described, a rotatable circular drum, sausage pinching means at circumferentially spaced points of said drum and disposed substantially parallel to the axis of said drum, said means including sets of opposed longitudinally slidable members, laterally spaced circumferentially extending arcuate plates engageable directly by said slidable members during rotation of the drum for moving said members to operative pinching position, rotatable means between the circumferentially spaced points aforesaid for twisting sausage, the arcuate plates being continuous and of sufficient length to be engaged simultaneously by the slidable members of a plurality of sets, and means operable during rotation of the drum for rotating the twisting means.

RICHARD SWOBODA, Sr.